US012715435B2

(12) United States Patent
Tsuchiya et al.

(10) Patent No.: US 12,715,435 B2
(45) Date of Patent: Aug. 25, 2026

(54) LANE STRUCTURE ESTIMATION

(71) Applicants: Nissan North America, Inc., Franklin, TN (US); Nissan Motor Co., Ltd., Yokohama (JP)

(72) Inventors: Chikao Tsuchiya, Cupertino, CA (US); Kanako Sakai, Kanagawa (JP); Hsin-Min Cheng, Millbrae, CA (US); Christopher Ostafew, Mountain View, CA (US)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 124 days.

(21) Appl. No.: 18/909,512

(22) Filed: Oct. 8, 2024

(65) Prior Publication Data

US 2026/0097763 A1 Apr. 9, 2026

(51) Int. Cl.
*B60W 30/12* (2020.01)
*G01C 21/30* (2006.01)

(52) U.S. Cl.
CPC ............. *B60W 30/12* (2013.01); *G01C 21/30* (2013.01); *B60W 2420/408* (2024.01); *B60W 2556/40* (2020.02)

(58) Field of Classification Search
CPC ........... B60W 30/12; B60W 2420/408; B60W 2556/40; G01C 21/30
See application file for complete search history.

(56) References Cited

U.S. PATENT DOCUMENTS

2017/0364082 A1* 12/2017 Taieb ..................... G01C 21/30
2019/0325738 A1* 10/2019 Dorum ................. G08G 1/0129
2024/0255291 A1* 8/2024 Shashua ................. G01C 21/30
2024/0280365 A1* 8/2024 Higuchi ............... G01C 21/165
(Continued)

OTHER PUBLICATIONS

C. Rose, J. Britt, J. Allen and D. Bevly, "An Integrated Vehicle Navigation System Utilizing Lane-Detection and Lateral Position Estimation Systems in Difficult Environments for GPS," in IEEE Transactions on Intelligent Transportation Systems, vol. 15, No. 6, pp. 2615-2629, Dec. 2014 (Year: 2014).*
(Continued)

*Primary Examiner* — Russell Frejd
*Assistant Examiner* — Brittany Renee Peko
(74) *Attorney, Agent, or Firm* — Young Basile Hanlon & MacFarlane. P.C.

(57) ABSTRACT

An apparatus of a vehicle with a processor. The processor is configured to generate at least one landmark within a vehicle transportation network that includes a lane. The processor generates lane cues for the lane as the vehicle travels within the vehicle transportation network. The processor aligns the lane cues. The processor generates a lane graph estimation based upon the lane cues so that the vehicle travels substantially along a center of the lane within the vehicle transportation network. The processor compares the center of the lane generated by the lane graph estimation to the at least one landmark to check a location of the center of the lane. The vehicle is at least temporarily free of communication with a global positioning satellite (GPS), a global navigation satellite system (GNSS), or both as the vehicle travels within the vehicle transportation network and generates the lane cues.

20 Claims, 10 Drawing Sheets

(56) References Cited

U.S. PATENT DOCUMENTS

| | | | | |
|---|---|---|---|---|
| 2025/0237510 | A1* | 7/2025 | Mori | G01C 21/30 |
| 2025/0243634 | A1* | 7/2025 | Pontillo | G08G 1/09 |

OTHER PUBLICATIONS

F. Zhu, Y. Shen, Y. Wang, J. Jia and X. Zhang, "Fusing GNSS/INS/Vision With a Priori Feature Map for High-Precision and Continuous Navigation," in IEEE Sensors Journal, vol. 21, No. 20, pp. 23370-23381, Oct. 15, 15, 2021, doi: 10.1109/JSEN.2021.3105110. (Year: 2021).*

A. Vu, A. Ramanandan, A. Chen, J. A. Farrell and M. Barth, "Real-Time Computer Vision/DGPS-Aided Inertial Navigation System for Lane-Level Vehicle Navigation," in IEEE Transactions on Intelligent Transportation Systems, vol. 13, No. 2, pp. 899-913, Jun. 2012, doi: 10.1109/TITS.2012.2187641. (Year: 2012).*

K. MassowÂ et al., "Deriving HD maps for highly automated driving from vehicular probe data,"Â 2016 IEEE 19th International Conference on Intelligent Transportation Systems (ITSC), Rio de Janeiro, Brazil, 2016, pp. 1745-1752, doi: 10.1109/ITSC.2016.7795794.

Biagioni, J., & Eriksson, J. (2012). Inferring Road Maps from Global Positioning System Traces: Survey and Comparative Evaluation. Â Transportation Research Record,Â 2291(1), 61-71.Â <https://doi.org/10.3141/2291-08>.

C. Doer, M. Henzler, H. Messner and G. F. Trommer, "HD Map Generation from Vehicle Fleet Data for Highly Automated Driving on Highways,"A 2020 IEEE Intelligent Vehicles Symposium (IV), Las Vegas, NV, USA, 2020, pp. 2014-2020, doi: 10.1109/IV47402.2020.9304781.

* cited by examiner

LANE STRUCTURE ESTIMATION

TECHNICAL FIELD

This disclosure relates generally to vehicle operational management and driving, and more particularly to real-time or near real-time control of a vehicle when a precise location of a lane is not available in real time.

BACKGROUND

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. The action may be selected using artificial intelligence (e.g., trained machine-learning models) or other decision-making models.

SUMMARY

Disclosed herein are aspects, features, elements, implementations, and teachings using belief state determination for real-time decision-making while a vehicle is traveling through a vehicle transportation network.

An aspect of the teachings herein is an apparatus of a vehicle that has a processor. The processor generates at least one landmark within a vehicle transportation network that includes a lane. The processor generates lane cues for the lane as the vehicle travels within the vehicle transportation network. The processor aligns the lane cues within the lane of the vehicle transportation network. The processor generates a lane graph estimation based upon the lane cues so that the vehicle travels substantially along a center of the lane within the vehicle transportation network. The processor compares the center of the lane generated by the lane graph estimation to the at least one landmark to check a location of the center of the lane. The vehicle is at least temporarily free of communication with a global positioning satellite (GPS), a global navigation satellite system (GNSS), or both as the vehicle travels within the vehicle transportation network and generates the lane cues.

Another aspect of the teachings herein is a method for controlling a vehicle. The method includes generating at least one landmark within a vehicle transportation network that include a lane. The method includes generating lane cues for the lane as vehicles travel within the vehicle transportation network. The method includes aligning the lane cues within the lane of the vehicle transportation network. The method includes generating a lane graph estimation based upon the lane cues so that the vehicles travel substantially along a center of the lane within the vehicle transportation network. The method includes comparing the center of the lane generated by the land graph estimation to the at least one landmark to check a location of the center of the lane. The vehicles are at least temporarily free of communication with a global positioning satellite (GPS), a global navigation satellite system (GNSS), or both as the vehicles travel within the vehicle transportation network and generate the lane cues.

Yet another aspect of the teachings herein is a non-transitory computer-readable medium storing instructions operable to cause one or more processors to perform operations. The operations include generating at least one landmark within a vehicle transportation network that include a lane. The operations include generating lane cues for the lane as vehicles travel within the vehicle transportation network. The operations include aligning the lane cues within the lane of the vehicle transportation network. The operations include generating a lane graph estimation based upon the lane cues to generate a node indicating a center of the lane within the vehicle transportation network. The operations include connecting successive nodes together to form a drive line. The operations include comparing the drive line to the at least one landmark to determine if the drive line and information regarding the at least one landmark match. The vehicles are at least temporarily free of communication with a global positioning satellite (GPS), a global navigation satellite system (GNSS), or both as the vehicles travel within the vehicle transportation network and generate the lane cues.

Variations in these and other aspects, features, elements, implementations, and teachings of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

FIG. 4 is a flow diagram of an example of traversing a vehicle transportation network using a localization determination in accordance with embodiments of this disclosure.

DETAILED DESCRIPTION

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. The sensors may include or be in communication with a global navigation satellite system (GNSS), a global position system (GPS), or both. As used herein, an AV encompasses a semi-autonomous vehicle.

During autonomous driving, and at different time steps (e.g., at every time step), some component (e.g., a decision-making module or model such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, model, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV. However, at times during autonomous control or semi-autonomous control the AV may lose contact with the GNSS, GPS, or both and the AV may estimate lane structures to maintain the AV within a given lane.

Certain of the components may be referred to as decision components herein. Each decision component recommends an action based on a belief state of the operational environment of the vehicle (e.g., a state based on the locations of objects and the AV, headings, speed, etc.), which belief state is described in additional detail below with regards to FIG. 3. The decision component may explicitly maintain the belief state. In such an implementation, the belief state is updated using the current belief state, an observation made (e.g., by an observation monitor or model), the selected action, sensors, prior data, light detecting and ranging (LiDAR), landmarks, non-autonomous driving, or a combination thereof. During real-time decision-making, the decision component explicitly maintaining the belief state may provide estimations to maintain the AV within a lane.

Figure 1:
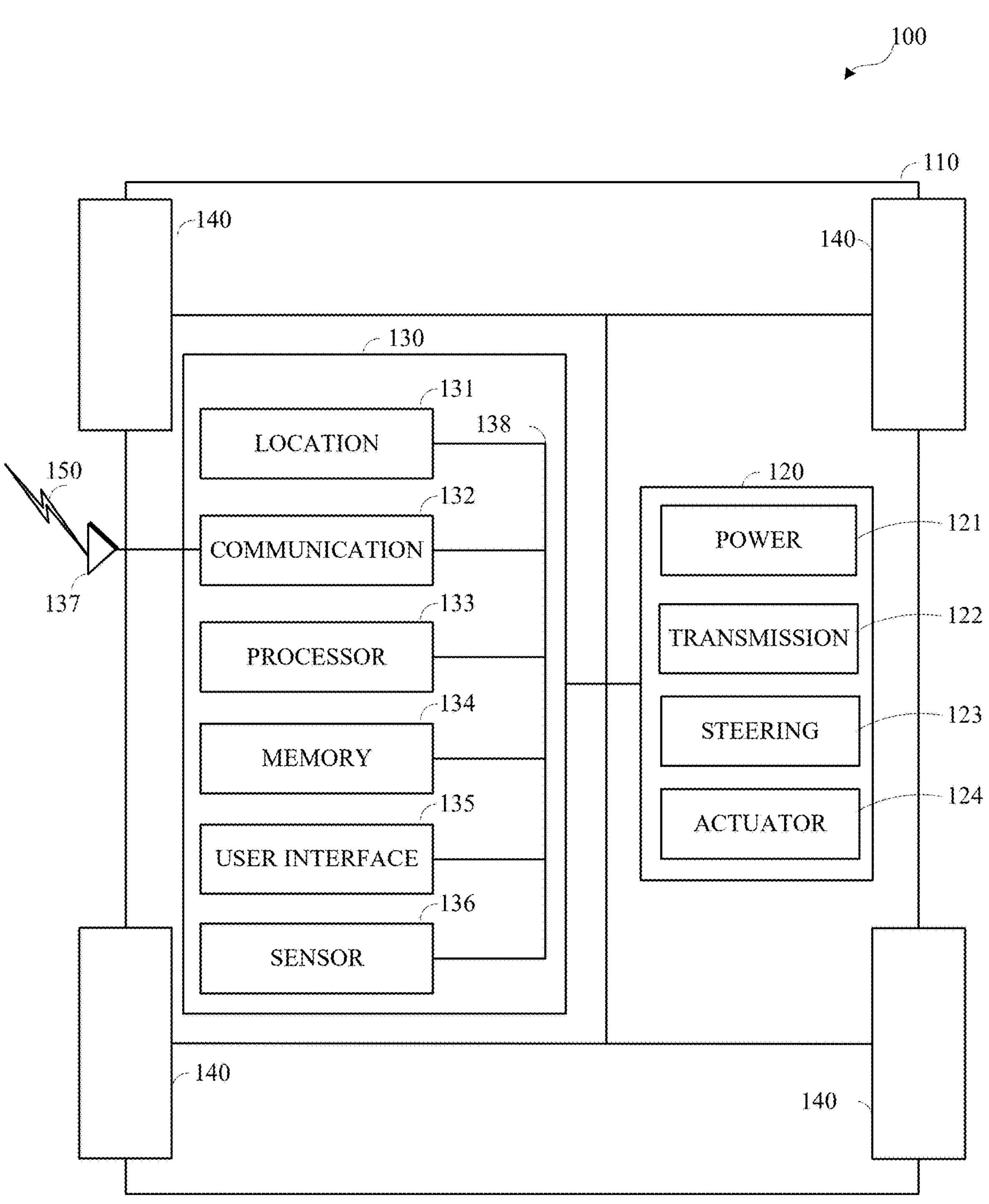
FIG. 1 is a diagram of an example of a vehicle in which the aspects, features, and elements disclosed herein may be implemented.

FIG. 1 is a diagram of an example of a vehicle in which the aspects, features, apparatus and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 (e.g., gas or electric) and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130, the actuator 124, or both. The steering unit 123 may be controlled by the controller 130, the actuator 124, or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may include vehicle information, position information, lane information, road information, landmark information, city information, road intersection information, or a combination thereof. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. The communication interface 137 may be in communication with a satellite. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, satellite signals, or a combination thereof. Although FIG. 1 shows a single communication unit 132 and a single communication interface 137, any number of communication units and any number of communication interfaces may be used. The communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include or be in communication with, a global positioning system (GPS) unit, a global navigation satellite system (GNSS), a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface that performs audio communication with a person and a touch display that performs visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, LiDAR, GPS. GNSS, internal measurement unit (IMU), cameras, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, pedestrians, pot holes, or a combination thereof. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

The vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and estimate a trajectory for the vehicle 100. The trajectory controller may output signals operable to control the vehicle 100 such that the vehicle 100 follows the trajectory that is determined by the trajectory controller. For example, the output of the trajectory controller can be an estimated trajectory that may be supplied to the powertrain 120, the wheels 140, or both. The trajectory may be control inputs such as a set of steering angles, with each steering angle corresponding to a point in time or a position. The trajectory may be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle may be controlled within the vehicle transportation network to move therein within a tolerance of one or more sides of the vehicle 100. For example, the vehicle 100 may move within the vehicle transportation network and maintain a distance of about 1 foot or less from a lane line. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
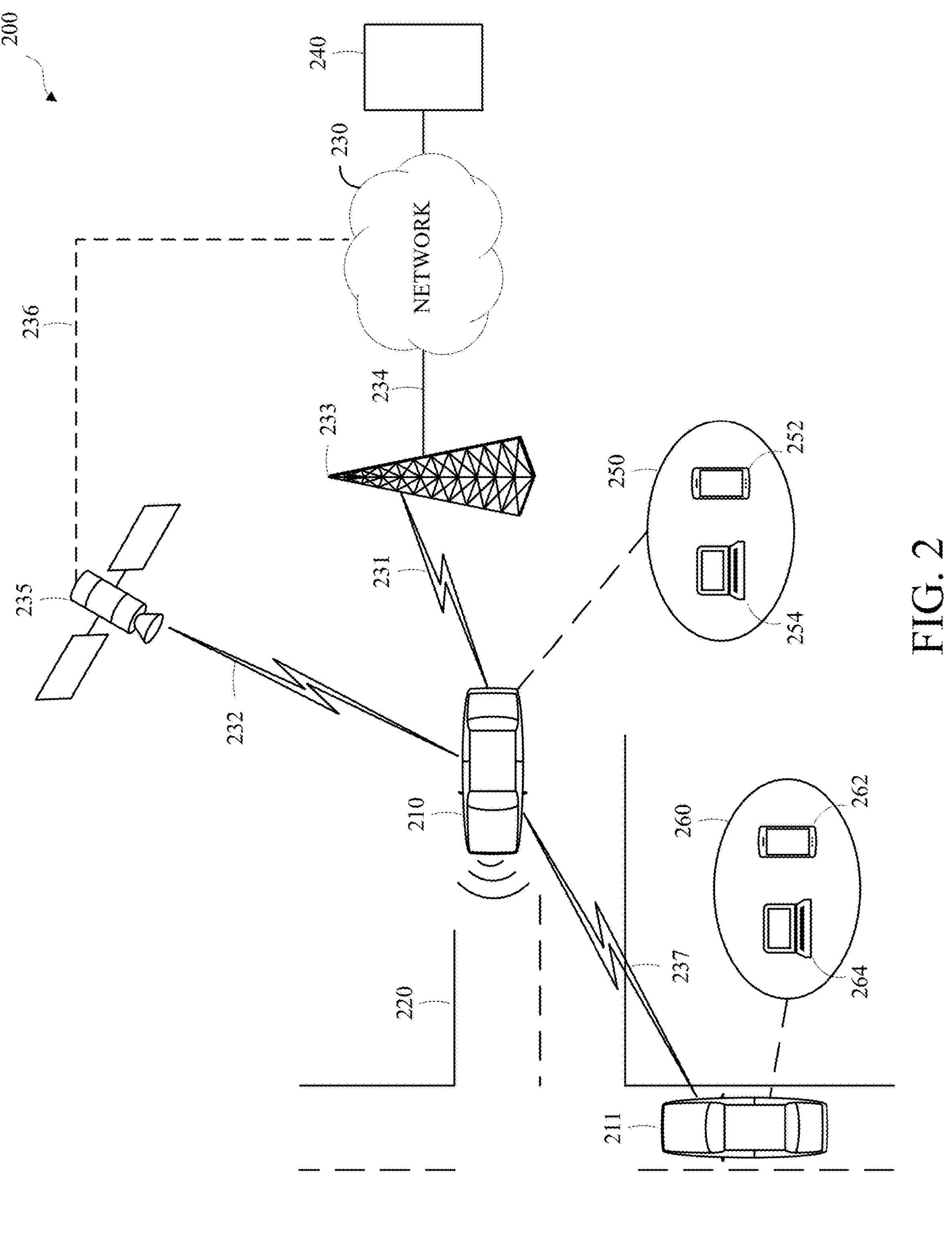
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

A vehicle 210/211 may communicate via a wired communication link (not shown), a wireless communication link 231/232/237, or a combination of any number of wired or wireless communication links. A vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/211. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. The host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or both.

FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

A vehicle 210/211 may be associated with an entity 250/260, such as a driver, operator, or owner of the vehicle. An entity 250/260 associated with a vehicle 210/211 may be associated with one or more personal electronic devices 252/254/262/264, such as a smartphone 252/262 or a computer 254/264. A personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 is shown as navigable areas (e.g., roads), but the vehicle transportation network 220 may also include one or more unnavigable areas, such as a building, one or more partially navigable areas, such as a parking areas, dirt roads, or pedestrian walkways, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network 220, or a portion thereof, may be represented as vehicle transportation network data. For example, vehicle transportation network data 220 may be expressed as a hierarchy of elements, such as markup language elements, which may be stored in a database or file. For simplicity, the figures herein depict vehicle transportation network data representing portions of a vehicle transportation network 220 as diagrams or maps; however, vehicle transportation network data 220 may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

The vehicles 210/211 may store the information from the vehicle transportation network 220 so that if communication with the network 230, the satellite 235, or both is lost the vehicles 210/211 may continue to autonomously control themselves. The stored information from the vehicle transportation network 220 may be used along with other information collected by the vehicles 210/211, the network 230, the satellite 235, or a combination thereof to control the vehicle 210/211 if communication with the network 230, the satellite 235, or both is lost.

Figure 3:
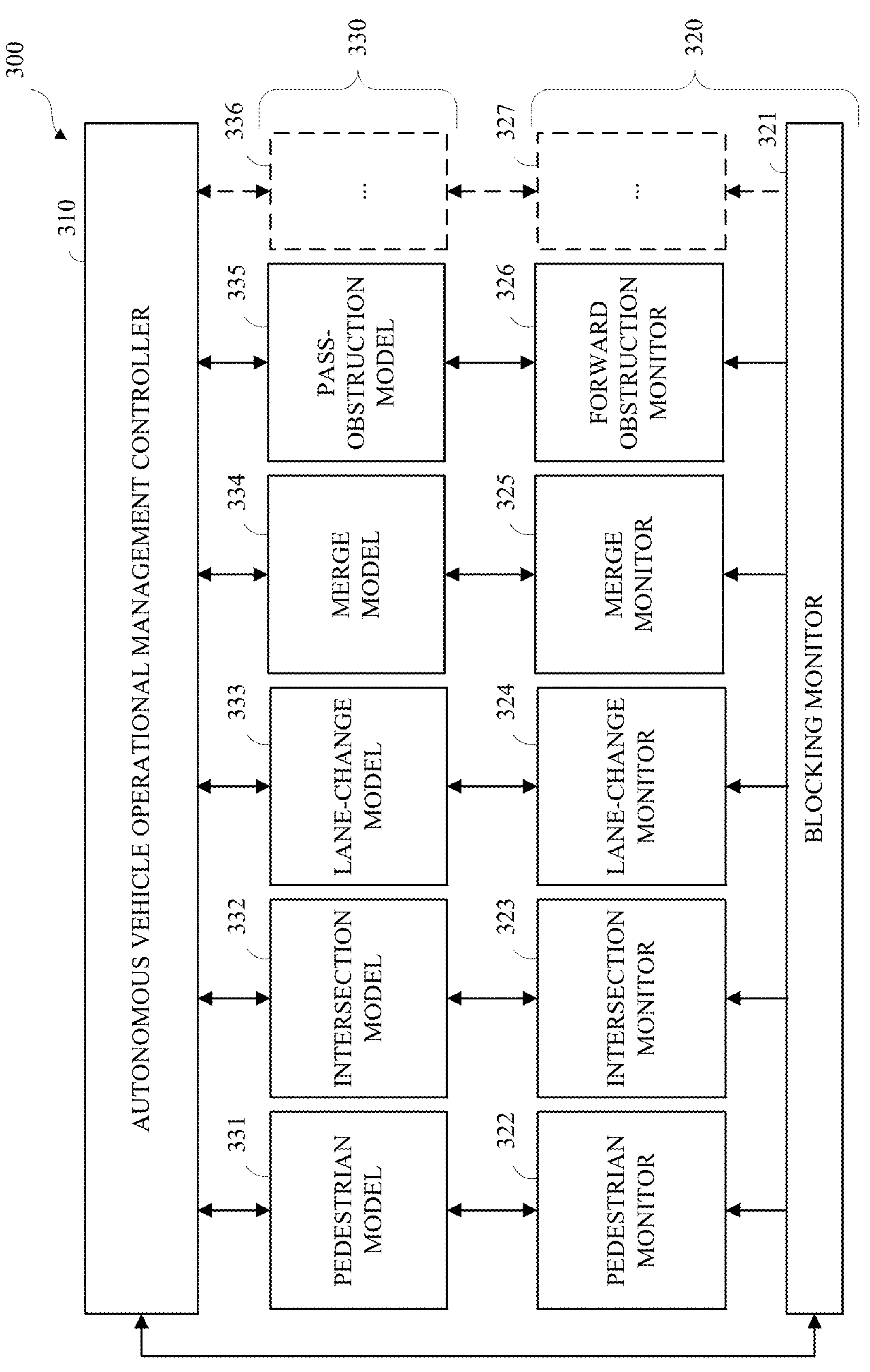
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous decision-making, at least in part.

The autonomous vehicle may traverse a vehicle transportation network, or a portion thereof, which may include traversing distinct vehicle operation scenarios. A distinct vehicle operation scenario may include any distinctly identifiable set of operative conditions that may affect the operation of the autonomous vehicle within a defined spatiotemporal area, or operational environment, of the autonomous vehicle. For example, a distinct vehicle operation scenario may be based on a number or cardinality of roads, road segments, or lanes that the autonomous vehicle may traverse within a defined spatiotemporal distance. In another example, a distinct vehicle operation scenario may be based on one or more traffic control devices that may affect the operation of the autonomous vehicle within a defined spatiotemporal area, or operational environment, of the autonomous vehicle. A distinct vehicle operation scenario may be based on one or more identifiable rules, regulations, or laws that may affect the operation of the autonomous vehicle within a defined spatiotemporal area, or operational environment, of the autonomous vehicle. A distinct vehicle operation scenario may be based on one or more identifiable external objects that may affect the operation of the autonomous vehicle within a defined spatiotemporal area, or operational environment, of the autonomous vehicle.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may control the vehicle to traverse the vehicle transportation network, or a portion thereof. Controlling the vehicle to traverse the vehicle transportation network may include, monitoring the operational environment of the vehicle, identifying or detecting distinct vehicle operation scenarios, identifying candidate vehicle control actions based on the distinct vehicle operation scenarios, and controlling the vehicle to traverse a portion of the vehicle transportation network in accordance with one or more of the candidate vehicle control actions.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operation scenarios. For example, the relative orientation, trajectory, expected path, of external objects may be represented within respective distinct vehicle operation scenarios. In another example, the relative geometry of the vehicle transportation network may be represented within respective distinct vehicle operation scenarios.

The autonomous vehicle may traverse multiple distinct vehicle operation scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operation scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operation scenarios, or a combination thereof. For example, the AVOMC 310 may identify and track external objects within the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received by the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment information representing aspects of the operational environment of the autonomous vehicle, and output the operational environment information to one or more scenario-specific monitors, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment information representing scenario-specific aspects of the operational environment of the autonomous vehicle, and output the operational environment information to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment information to one or more elements of the autonomous vehicle operational management system 300, such as the AVOMC 310. Although not shown in FIG. 3, a scenario-specific operational environment monitor 322, 323, 324, 325, 326 may output operational environment data or the derived operational environment information to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310.

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. The merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the vehicle. For example, the blocking monitor 321 may receive the operational environment data from the AVOMC 310, from a sensor of the vehicle, from an external device, such as a remote vehicle or an infrastructure device, or a combination thereof. The blocking monitor 321 may read the operational environment data, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation modules 330.

The AVOMC 310 may identify one or more distinct vehicle operation scenarios based on one or more aspects of the operational environment represented by the operational environment information. For example, the AVOMC 310 may identify a distinct vehicle operation scenario in response to identifying, or based on, the operational environment information indicated by one or more of the operational environment monitors 320. The distinct vehicle operation scenario may be identified based on route data, sensor data, or a combination thereof. For example, the AVOMC 310 may identify one or multiple distinct vehicle operation scenarios corresponding to an identified route for the vehicle, such as based on map data corresponding to the identified route, in response to identifying the route. Multiple distinct vehicle operation scenarios may be identified based on one or more aspects of the operational environment represented by the operational environment information. For example, the operational environment information may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment information, such as the identification of an upcoming scenario. An upcoming scenario may be a distinct vehicle operation scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of additional or different types of SSOCEMs as the operation control evaluation models 330. For example, the AVOMC 310 may instantiate an instance of a SSOCEM in response to identifying a distinct vehicle operation scenario. The AVOMC 310 may instantiate multiple instances of one or more SSOCEMs based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment information, or one or more aspects thereof, to another unit of the autonomous vehicle, such as the blocking monitor 321 or one or more instances of the operation control evaluation models 330. For example, the AVOMC 310 may communicate the probabilities of availability, or corresponding blocking probabilities, received from the blocking monitor 321 to respective instantiated instances of the operation control evaluation models 330. The AVOMC 310 may store the operational environment information, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

An operation control evaluation model 330, once instantiated, can receive the operational environment information, which may include sensor data, to determine and output a candidate vehicle control action, also called a candidate action herein. A candidate action is a vehicle control action that is identified by the particular operation control evaluation model 330 as the likely optimal action for the vehicle to perform that will handle a particular scenario. For instance, an operation control evaluation model 330 configured to handle intersections (e.g., an intersection SSOCEM 332) may output a "proceed", a candidate action that suggests proceeding through an intersection. At the same time, an operation control evaluation model 330 for handling lane changes (e.g., the lane change SSOCEM 333) may output a "turn left" candidate action indicating that the vehicle should merge left by two degrees. In some implementations, each operation control evaluation model 330 outputs a confidence score indicating a degree of confidence in the candidate action determined by the operation control evaluation model 330. For instance, a confidence score greater than 0.95 may indicate a very high confidence in the candidate action, while a confidence score less than 0.5 may indicate a relatively low degree of confidence in the candidate action. Further details of an operation control evaluation model 330 are described below.

The AVOMC 310 may receive one or more candidate actions from respective instances of the operation control evaluation models 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The AVOMC 310 utilizes hardcoded logic to determine the vehicle control action from the candidate actions. For example, the AVOMC 310 may select the candidate action having the highest confidence score. The AVOMC 310 may select the candidate action that is the least likely to result in a collision. The AVOMC 310 may generate a compound action based on two or more non-conflicting candidate actions (e.g., compounding 'proceed' and 'turn left by two degrees' to result in a vehicle control action that causes the vehicle to veer left and proceed through an intersection). The AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Process (POMDP), which may describe how respective candidate actions affect subsequent candidate actions, and may include a reward function that outputs a positive or negative reward for respective vehicle control actions.

The AVOMC 310 may uninstantiate an instance of an operation control evaluation model 330. For example, the AVOMC 310 may identify a distinct set of operative conditions as indicating a distinct vehicle operation scenario for the autonomous vehicle, instantiate an instance of an operation control evaluation model 330 for the distinct vehicle operation scenario, monitor the operative conditions, subsequently determine that one or more of the operative conditions has expired, or has a probability of affecting the operation of the autonomous vehicle below a defined threshold, and the AVOMC 310 may uninstantiate the instance of the operation control evaluation model 330.

As referred to briefly above, an operation control evaluation model 330 may model a respective distinct vehicle operation scenario. The autonomous vehicle operational management system 300 includes any number of operation control evaluation models 330, each modeling a respective distinct vehicle operation scenario. Modeling a distinct vehicle operation scenario may include generating and/or maintaining state information representing aspects of an operational environment of the vehicle corresponding to the distinct vehicle operation scenario, identifying potential interactions among the modeled aspects respective of the corresponding states, and determining a candidate action that solves the model. Stated more simply, an operation control evaluation model 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each operation control evaluation model 330 includes computer-executable instructions that define a manner by which the models, e.g., decision process models, operate and a manner by which the models are utilized.

An operation control evaluation model 330 may implement a discrete time stochastic control process, such as a POMDP model, which may be a single-agent model that models a distinct vehicle operation scenario, which may include modeling uncertainty, using a set of states (S), a set of actions (A), a set of observations (Ω), a set of state transition probabilities (T), a set of conditional observation probabilities (O), a reward function (R), or a combination thereof. A POMDP model may be defined or described as a tuple <S, A, Ω, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operation scenario. Each state (state space) from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

For example, a remote or external object operating in the proximity of the vehicle may affect the operation of the vehicle and may be represented in a model. The model may include representing the following identified or expected information for the remote object, such as a remote vehicle: its geospatial location, its path, heading, or both, its velocity, its acceleration or deceleration rate, or a combination thereof corresponding to a respective temporal location. A respective set of states may be defined for each distinct vehicle operation scenario. At instantiation, the current state of the model may correspond to a contemporaneous state or condition of the operating environment.

An action from the set of actions (A) may indicate an available vehicle control action at each state in the set of states (S). A respective set of actions may be defined for each distinct vehicle operation scenario. Each action (action space) from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation from the set of observations (Ω) may indicate available observable, measurable, or determinable data for each state from the set of states (S). A respective set of observations may be defined for each distinct vehicle operation scenario. Each observation (observation space), from a set of observations (Ω) may include one or more defined observation factors. Although some examples of observation factors for some models are described herein, a model, including any model described herein, may include any number, or cardinality, of observation factors. Each observation factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as $T: S \times A \times S \rightarrow [0, 1]$. A respective set of state transition probabilities (T) may be defined for each distinct vehicle operation scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

The set of state transition probabilities may be identified based on the operational environment data. For example, the operational environment data may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; or any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

A conditional observation probability from the set of conditional observation probabilities (O) may represent probabilities of making respective observations (Ω) based on the operational environment of the vehicle, as represented by the set of states (S), responsive to the actions of the vehicle, as represented by the set of actions (A), which may be represented as $O: A \times S \times \Omega \rightarrow [0, 1]$. A respective set of conditional observation probabilities (O) may be defined for each distinct vehicle operation scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

An example may be illustrated with reference to an intersection that the vehicle is approaching by traversing a first road. Contemporaneously, a remote vehicle may approach the intersection by traversing a second road. The vehicle may identify and evaluate operational environment data, such as sensor data, corresponding to the intersection, which may include operational environment data corresponding to the remote vehicle. The operational environment data may be inaccurate, incomplete, or erroneous. The vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle. A model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as $R: S \times A \rightarrow \mathbb{R}$.

Solving a model may include determining a policy or solution, which may be a function, that maximizes the accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states, identifying an action from the set of actions, determining a subsequent, or successor, state from the set of states subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward or penalty, which may be a discounted reward or penalty. The policy may indicate an action corresponding to the maximum utility value for a respective state. Solving a POMDP model is similar to solving the MDP model, except based probabilities for respective states and subject to observation probabilities corresponding generating observations for respective states. Where a probability is associated with a state within a POMDP model and other models that do not rely on discrete states, the states may be referred to as belief states. Thus, solving the SSOCEM model may include evaluating the possible state-action-state transitions and updating respective belief states, such as using Bayes' rule, particle filters, etc., based on respective actions and observations.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be an MDP model and the intersection-SSOCEM 332 may be a POMDP model. The AVOMC 310 may instantiate any number of instances of the operation control evaluation models 330 based on the operational environment data. Although not expressly shown, in some embodiments an operational environment monitor 320 may identify occlusions, may identify or determine a probability that an external object is occluded, or hidden, by an identified occlusion, and may include occluded vehicle probability information in one or more operation control evaluation models 330.

One or more of the AVOMC 310, the operational environment monitors 320, or the operation control evaluation models 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the operation control evaluation models 330 may be independent of the operational rate of others.

The operation control evaluation models 330 (e.g., the SSOCEMs) correspond to the decision components initially referenced. That is, an operation control evaluation model 330 can recommend an action based on the belief state of the operational environment of the vehicle. Where an operation control evaluation model 330 explicitly maintains a belief state, the belief state is updated using the current belief state, an observation made (e.g., by an observation monitor or model, such as one or more of the operational environment monitors 320), and the action selected by the operation control evaluation model 330. While this technique is useful for the off-line development of policy that maps any belief state to an action, problems can arise in real-time decision-making of a operation control evaluation model 330 due to sensor noise or errors, an error in the model, or both.

One problem may be illustrated by referring to FIG. 2. The vehicle 210 monitors the conditions of the operational environment, such as an upcoming scenario within the vehicle transportation network 220. For example, the vehicle 210 is approaching an intersection. The AVOMC 310 of the vehicle 210 may instantiate an instance of an intersection model 332, and more specifically a T-intersection model. Assume that a current belief state is 0.8 that the remote vehicle 211 is approaching the intersection and 0.2 that the remote vehicle 211 is at the intersection. The intersection monitor 323, due to sensor noise, may produce or otherwise generate an observation (e.g., an observation Ω) that the vehicle 211 is at a goal of the scenario (e.g., past the intersection). This observation is impossible given the belief state. Known techniques for updating the belief state, e.g., Bayes' rule, particle filters, Kalman filters, etc., fail where the observation is impossible given the (e.g., current) belief state. For example, the update may fail due to a division by 0. Thus, the intersection model 332 can fail to produce a candidate action.

Errors may result in the model, such as an operation control evaluation model 330. An error in the model, as observations are gained, may cause the model to update to any belief. More specifically, small errors such as an error in the probability of an observation and/or an error in how the operational environment transitions accumulate as the belief state is repeatedly updated. The belief state can drift in an incorrect direction (i.e., away from a belief state that reflects actual transportation network and the tracked object therein).

These problems may be addressed by modifying or replacing an operational environment monitor 320 as previously described such that the updated or new operational environment monitor determines or otherwise computes a belief state directly from raw perception of the operational environment (e.g., features sensed, determined, or otherwise perceived as the operational environment data described above). The operational environment monitor does so without relying on a belief update equation. The belief state is determined instead of or in addition to maintaining a belief state within a SSOCEM model. The belief state determination is particularly desirable for real-time decision-making of the vehicle.

Figure 4:
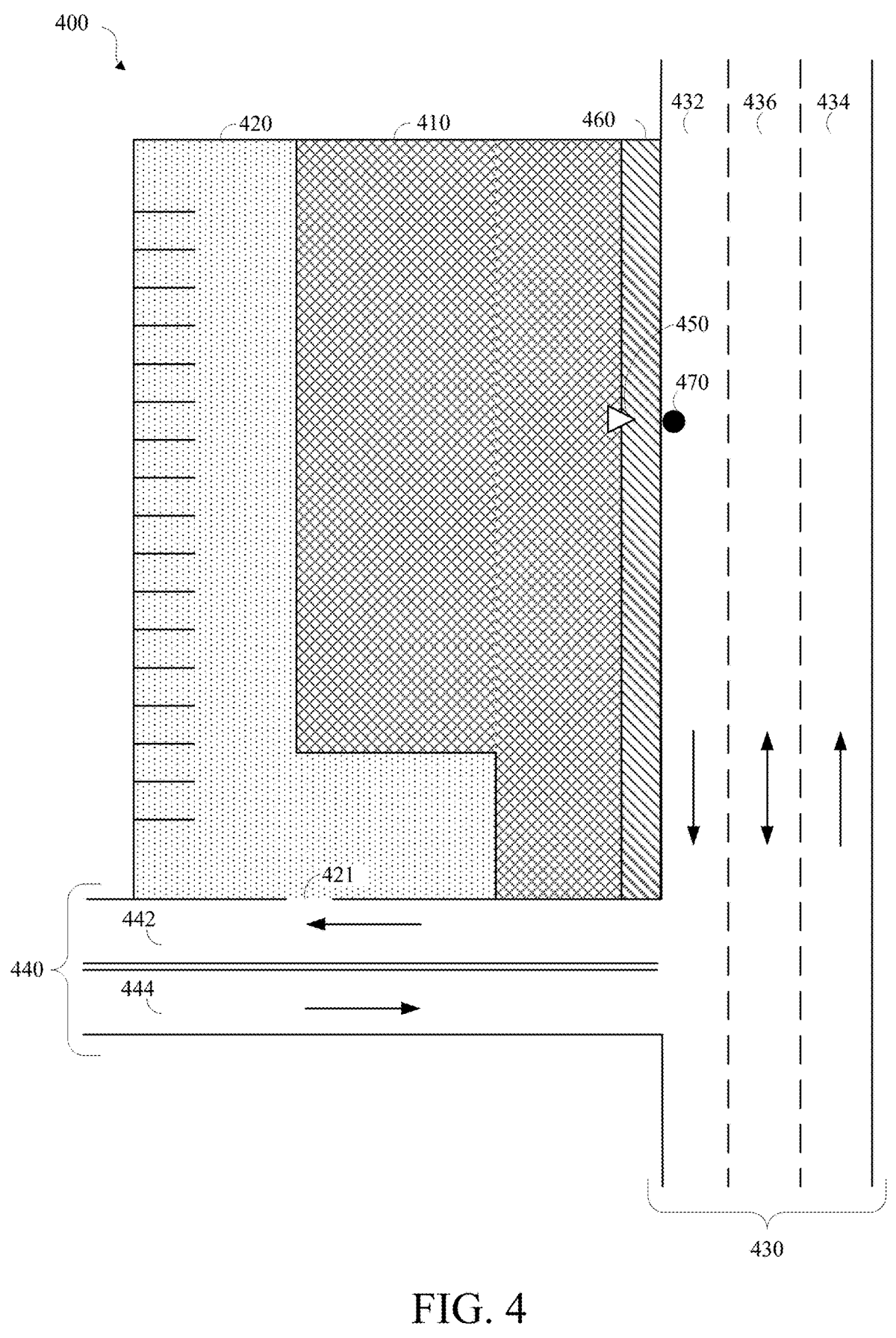

FIG. 4 is a diagram of a portion of a vehicle transportation network in accordance with this disclosure. A vehicle transportation network 400 may include one or more unnavigable areas 410, such as a building, one or more partially navigable areas, such as parking area 420, one or more navigable areas, such as roads 430/440, or a combination thereof. In some embodiments, an autonomous vehicle, such as the vehicle 100 shown in FIG. 1, one of the vehicles 210/211 shown in FIG. 2, a semi-autonomous vehicle, or any other vehicle implementing autonomous driving, may traverse a portion or portions of the vehicle transportation network 400.

The vehicle transportation network 400 may include one or more interchanges 421 between one or more navigable, or partially navigable, areas 420/430/440. For example, the portion of the vehicle transportation network 300 shown in FIG. 3 includes an interchange 421 between the parking area 420 and road 440. A portion of the vehicle transportation network 400, such as a road 430/440, may include one or more lanes 432/434/436/442/444 and may be associated with one or more directions of travel, which are indicated by arrows in FIG. 4.

A vehicle transportation network, or a portion thereof, such as the portion of the vehicle transportation network 400 shown in FIG. 4, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information or a combination thereof.

The vehicle transportation network may be associated with, or may include, a pedestrian transportation network. For example, FIG. 4 includes a portion 460 of a pedestrian transportation network, which may be a pedestrian walkway. Although not shown separately in FIG. 4, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network information may identify a building, such as the unnavigable area 410, and the adjacent partially navigable parking area 420 as a point of interest, a vehicle may identify the point of interest as a destination, and the vehicle may travel from an origin to the destination by traversing the vehicle transportation network. Although the parking area 420 associated with the unnavigable area 410 is shown as adjacent to the unnavigable area 410 in FIG. 4, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 450 shown in FIG. 4.

A destination may be associated with one or more docking locations, such as the docking location 470 shown in FIG. 4. A docking location 470 may be a designated or undesignated location or area in proximity to a destination at which a vehicle may stop, stand, or park such that docking operations, such as passenger loading or unloading, may be performed. The vehicle transportation network information may include docking location information, such as information identifying a geolocation of the docking location 470. A docking location information may identify a type of docking operation associated with a docking location 470. For example, a destination may be associated with a first docking location for passenger loading and a second docking location for passenger unloading.

Figure 5:
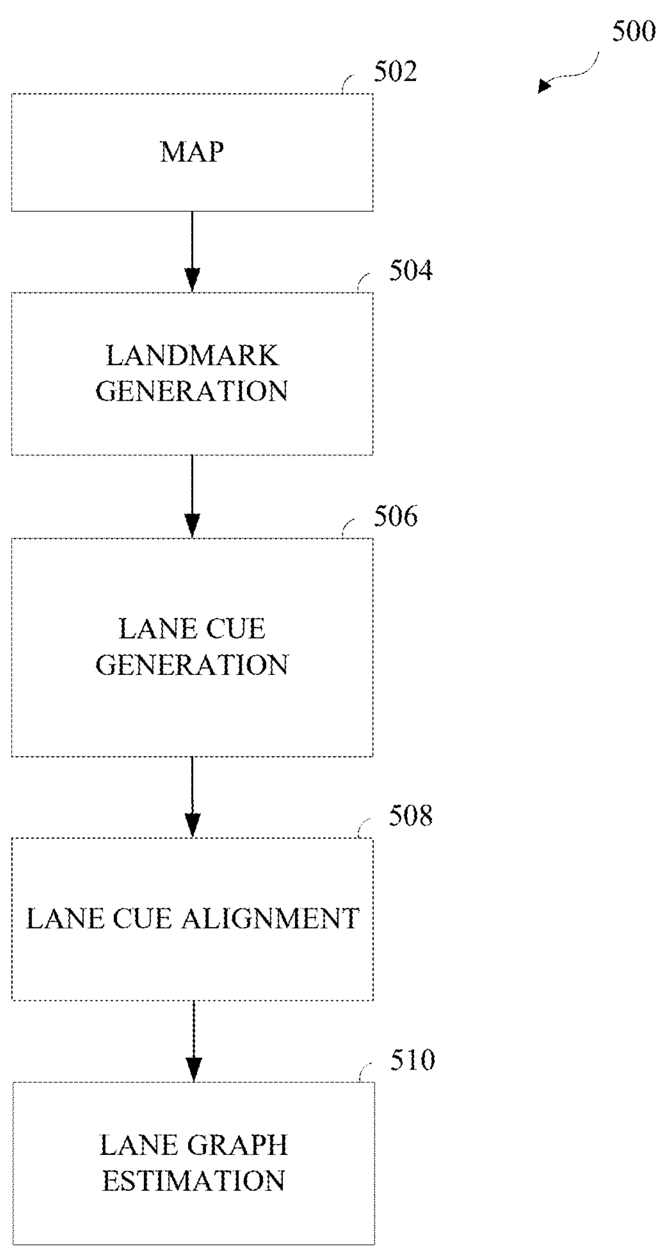
FIG. 5 is a flowchart to estimate a drive line.

FIG. 5 illustrates a flowchart 500 illustrating a creation of a drive line with a vehicle transportation network (e.g., lanes of a road system). The drive line may be generated in the absence of a satellite signal (e.g., offline) such as a global positioning system (GPS) or a global navigation satellite system (GNSS). For example, as a vehicle is traveling through a city, large buildings may block the positioning signals so that the positioning signals (e.g., from a GPS or GNSS) may not be available to assist the vehicle is navigating. The system and/or processor, upon realizing the positioning signal is not available (e.g., that the system is offline and is at least temporarily free of communication with a global positioning satellite (GPS), a global navigation satellite system (GNSS), or both) may consult a map 502 (e.g., a stored map of the vehicle transportation network). The controller may place a vehicle in a last known location, in a coordinate system, or both on the map 502. A upcoming intersection may be identified from the map 502 to estimate a position of the vehicle relative to the upcoming intersection to generate some of the one or more landmarks. The map 502 may be reviewed or viewed to identify known landmarks proximate to the vehicle when guidance is offline.

The system and/or controller upon reviewing the map 502 may generate landmarks 504 (e.g., keyframes) in a region around the vehicle so that the controller assists in avoiding the landmarks and to control by using the landmarks as points of interest along a route. Generating landmarks 504 may include identifying lanes, buildings, intersections, lane boundaries, or a combination thereof. Generating landmarks 504 may be performed in real time, only when the system is offline, continuously, or a combination thereof. The generating landmarks 504 may identify landmarks from intersection to intersection (e.g., upcoming intersections). Thus, the next intersection may be identified and this may be created as a landmark 504. Once a landmark 504 is generated then those landmarks may assist in generating lane cues 506.

Lane cue generation 506 may include determining a center of a lane, a first side of a lane, a second side of a lane, a location of other vehicles within lanes, or a combination thereof. The lane cue generation 506 may generate locations (e.g., cues) of the vehicle within a lane (e.g., at measurement locations) as the vehicle travels within the lane. The cues (e.g., points within the lanes) may be generated at predetermined distances apart. For example, a cue (e.g., or a bar that is perpendicular to a direction of travel so that the vehicle crosses the cue as the vehicle moves) may be generated every about 1 meter or more, about 2 meters or more, about 3 meters or more, or about 5 meters or more. A cue may generated about every 1 m or less, about 0.75 m or less, about 0.5 m or less, or about 0.25 m or less. Once the lane cues 506 are generated the lane cues may be aligned 508 within the vehicle transportation network.

The cues may be aligned 508 by connecting each of the cues together, connecting the cues by a line to begin generating a location along which a vehicle may travel, or both. Multiple lane cues from multiple trips, vehicles, or both may be collected and aligned 508. The cues may be compared to data collected by other vehicle sensors and then the cues with the addition of vehicle data may be aligned 508. For example, LiDAR may be used to monitor a location within a lane and the LiDAR data may be compared to the lane cues to align the cues within the vehicle transportation network. Once all of the cues are aligned 508 the cues are graphed at each measurement location to provide a lane graph estimation 510.

The lane graph estimation 510 may plot cues at each measurement location. Thus, if 10 cues were taken at each measurement location then the 10 cues may be plotted. The number of cues may increase over time as a vehicle or more vehicles travel within a location where all or a portion of a controller is offline. For example, data, lane graph estimations 510 or both may be uploaded to a database or a cloud and then shared so that the database may be built as to locations where the system and/or controller are offline. Data may be collected at time the system is operating (e.g., offline, online, partly offline, or a combination thereof).

The plots may be reviewed and the plots with the highest concentration may be selected as a node that forms one point in a lane graph (e.g., a drive line). The cues may be graphed 510 as a histogram and a peak (e.g., apex) of the histogram may form a node that generates a drive line within the vehicle transportation network.

Figure 6:
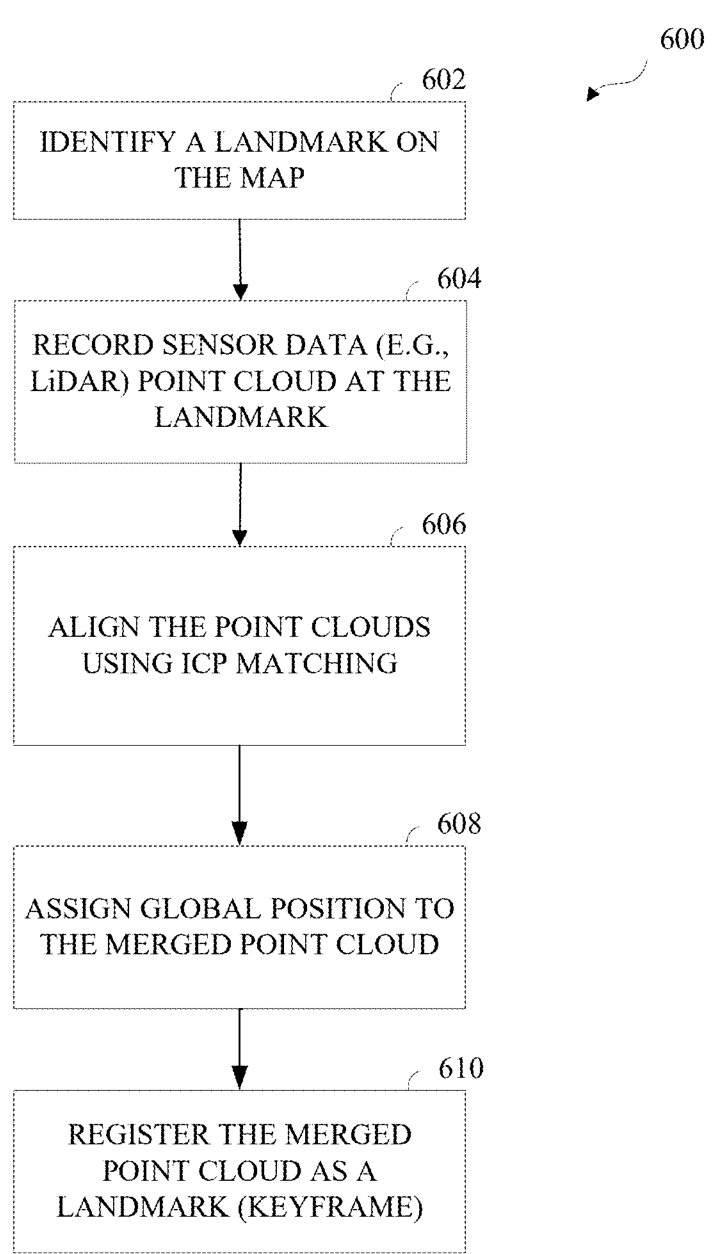
FIG. 6 is a flowchart to determine a location of a landmark.

FIG. 6 is a flowchart 600 illustrating a step of generating a landmark of the flowchart 500 of FIG. 5. The flowchart 600 may begin by identifying a landmark 602 (also called a keyframe) on a map of all or a portion of the vehicle transportation network. The landmark may be a static object. The landmark may be a building, intersection, road, lane, portion of a lane, a located next to a road, a light, a sign, a signal, or a combination thereof. Identifying a landmark 602 may include identifying one or more locations at or within an intersection. For example, a first landmark may be at an entrance of an intersection, a second may be at a center of the intersection, and a third may be at an exit of an intersection.

Thereafter, sensor data at the identified landmarks 602 may be recorded 604 by one or more sensors of vehicle, such as the sensors 136. The sensor data recorded 604 by the sensors may create data points at or around the landmark (e.g., a point cloud). The data points at each landmark may provide one or more location points, reference points, or both. The sensors may record one or more data points, five or more data points, ten or more data points, twenty or more data points, or even thirty or more data points. The sensors may sense and then record ten or more data points or more per second, fifty or more data points per second, a hundred or more data points per second, or even one thousand or more data points per second. The sensors may be or include radar, light detection and ranging (LiDAR), cameras, ultrasonic sensors, monocular vision sensors, stereo vision sensors, or a combination thereof. The sensors may collect the sensor data, and then the sensor data may be recorded 604 in memory, such as the memory 134. Once all sensor data is recorded 604, a processor and/or system, such as the processor 133, may process the data.

The system, processor, or both may align the data points into a point cloud, match the points, or both 606. The processor may create a point cloud at or around the landmark so that data points surround the landmark, extend along a side of the landmark, are located before the landmark, are located behind the landmark, or a combination thereof. The data points of the point clouds may be matched relative to the location of the landmark from the map, a known location, a global position, or a combination thereof. The data points may be matched with the iterative closest point (ICP) algorithm. The data points may each be matched to a location on a coordinate system or a closest known location on a coordinate system. The data points once matched may then be assigned a global position 608. The assigned global position may be added into the point cloud. The assigned global position may be merged into the point cloud adjacent to a landmark. The global position may include a latitude, longitude, or both. The global position may be assigned an "x" coordinate and a "y" coordinate. The point cloud, once assigned a global position 608 including a merged point cloud, may then be registered as a landmark 610 (e.g., keyframe).

The merged point cloud may surround a landmark so that the landmark is identifiable by a second positioning system (e.g., a location on the map and a location within a point cloud). The merged point cloud registered as a landmark 610 may be registered at each of the identified landmarks 602 so that each of the landmarks becomes a registered landmark (keyframe). Thus, if a vehicle subsequently travels through or adjacent to the landmark, the vehicle will have points of reference and may continue to gather data related to the landmark. Further, the subsequent vehicle may travel within a lane of a roadway even though the GPS, GNSS, or both are offline or are not in communication with the system. The registered landmark 610 assists the vehicle with staying within a lane, avoiding objects outside of a lane, identifying other lanes, or a combination thereof so that the vehicle may continue to travel within a lane when GPS, GNSS, or both are not in communication or are offline. Thus, as more data is added to the point cloud, vehicles may more accurately drive within a lane.

Figure 7:
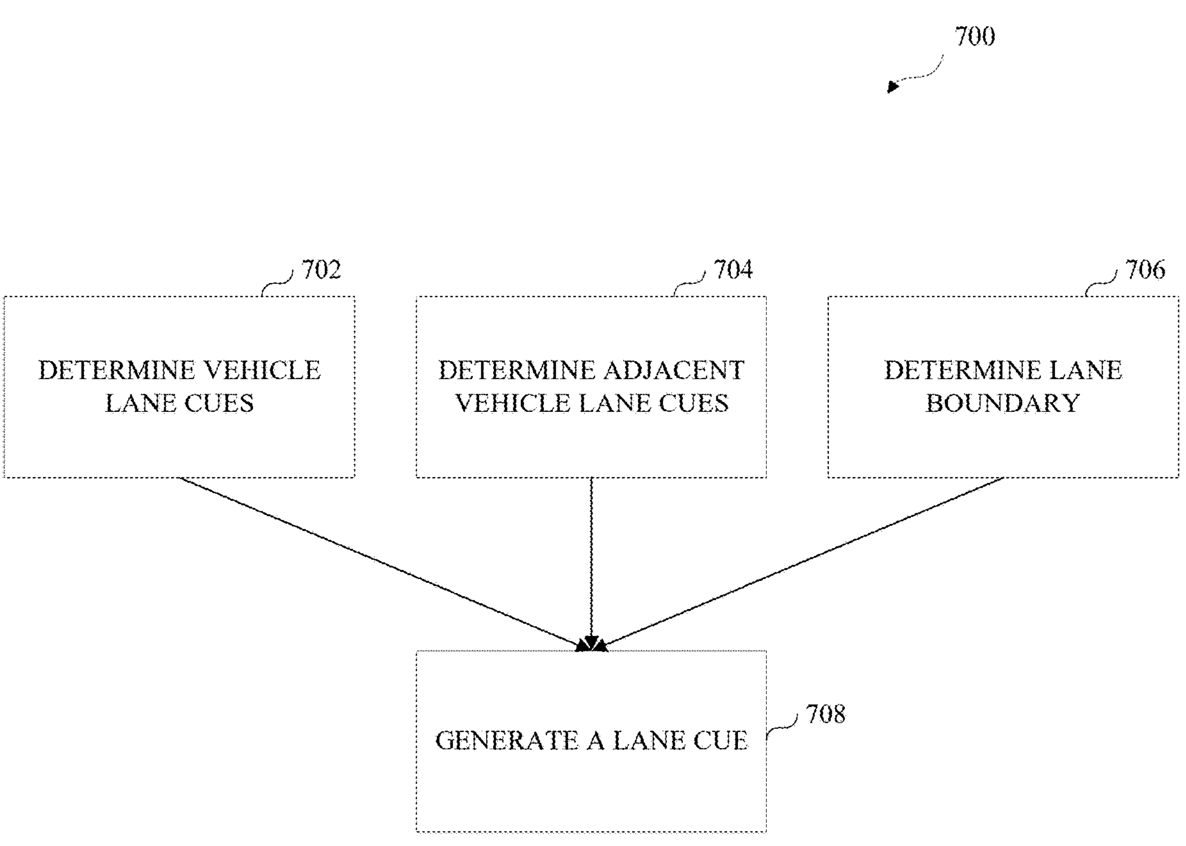
FIG. 7 is a flowchart to generate lane cues.

FIG. 7 illustrates generation of lane cues 700 such as the generation of lane cues 506 of FIG. 5. The lane cues may be lane cues of adjacent lanes that are generated with the sensors of the vehicle discussed herein such as LiDAR, radar, a camera system, or a combination thereof. The lane cues for an ego vehicle may be determined 702 by using an egocentric determination relative to the vehicle. For example, all of the lane cues collected may be relative to the ego or sensing vehicle (e.g., a vehicle housing the sensor). The lane cues may be determined 702 at predetermined distances. The predetermined distances may be the distances taught herein. The predetermined distances may be a location where the vehicle crosses a measurement location (e.g., location or bar). For example, a lane cue may be determined 702 as the vehicle crosses a bar (e.g., a line at the predetermined distance) at a trajectory within the vehicle transportation network. As the vehicle crosses the bar, the crossing point may become a lane cue that is determined 702. The number or cardinality of predetermined distances (e.g., bars and corresponding lane cues) may be determined by an amount of time the positioning system is offline, GPS is not available, GNSS is not available, or a combination thereof. The lane cues so determined 702 may be one set of lane cues identified by the vehicle to control the vehicle.

The system, vehicle, or both may determine a second set of lane cues by determining lane cues 704 of adjacent vehicles. More specifically, the system, vehicle, or both may determine adjacent vehicle lane cues 704 in a substantially same manner as the egocentric lane cues are determined 702. The vehicle (e.g., or a system within the vehicle) may track how adjacent vehicles travel within a lane. The vehicle may track or monitor surrounding vehicles (e.g., adjacent vehicles) as they cross predetermined distances (e.g., locations or bars). The predetermined distance related to adjacent vehicles may be the same predetermined distances as the vehicle comprising the system. Thus, information may be gathered as the vehicle crosses a bar and similarly as the adjacent vehicle crosses the bar. The vehicle may then gather data as to other lanes so that this information may be shared with other vehicles once the system is back online, if the vehicle subsequently travels along another road, or both. The adjacent vehicle lane cues may assist in creating nodes or a trajectory for a current lane, the adjacent lane, or both.

The vehicle including sensors may simultaneously generate a third set of lane cues while generating the first and second set of lane cues. The third set of lane cues may comprise lane boundaries. Thus, generating the third set of lane cues may be performed by determining lane boundaries 706, e.g., using the sensors taught herein. The sensors may determine a first lane line, a second lane line, or both. The sensors may determine a mid-point between a first lane line and a second lane line. The sensors may mark a lane cue at the mid-point. The sensors may mark a lane cue between the first lane line and the second lane line. The sensors may determine lane boundaries and then generate lane cues between the boundaries as the vehicle travels within a lane. Once lane boundaries 706 are determined, all of the lane cues may be combined together, compared, or both to generate a lane cue 708 that controls movement of the vehicle within the vehicle transportation network.

The vehicle, system, or both may compare the lane cues determined at 702, 704, and 706 to generate a lane cue 708 that is used to control the vehicle within the vehicle transportation network. The system may generate a lane cue 708 by averaging the lane cues determined at 702, 704, and 706 together. The system may generate lane cues 708 by comparing the lane cues to location positions (e.g., locations on a map). The system may review the lane cues determined at 702, 704, and 706 and determine which lane cue appears to be the most accurate based upon the data collected. Thus, three different measurement points may be compared to a map of all or a portion of the vehicle transportation network to check or ascertain lane locations when the processor, positioning system, or both is offline. Stated another way three different pointed derived from three different methods may be compared to map data to provide the vehicle with accurate lane information regarding the vehicle transportation network.

Figure 8:
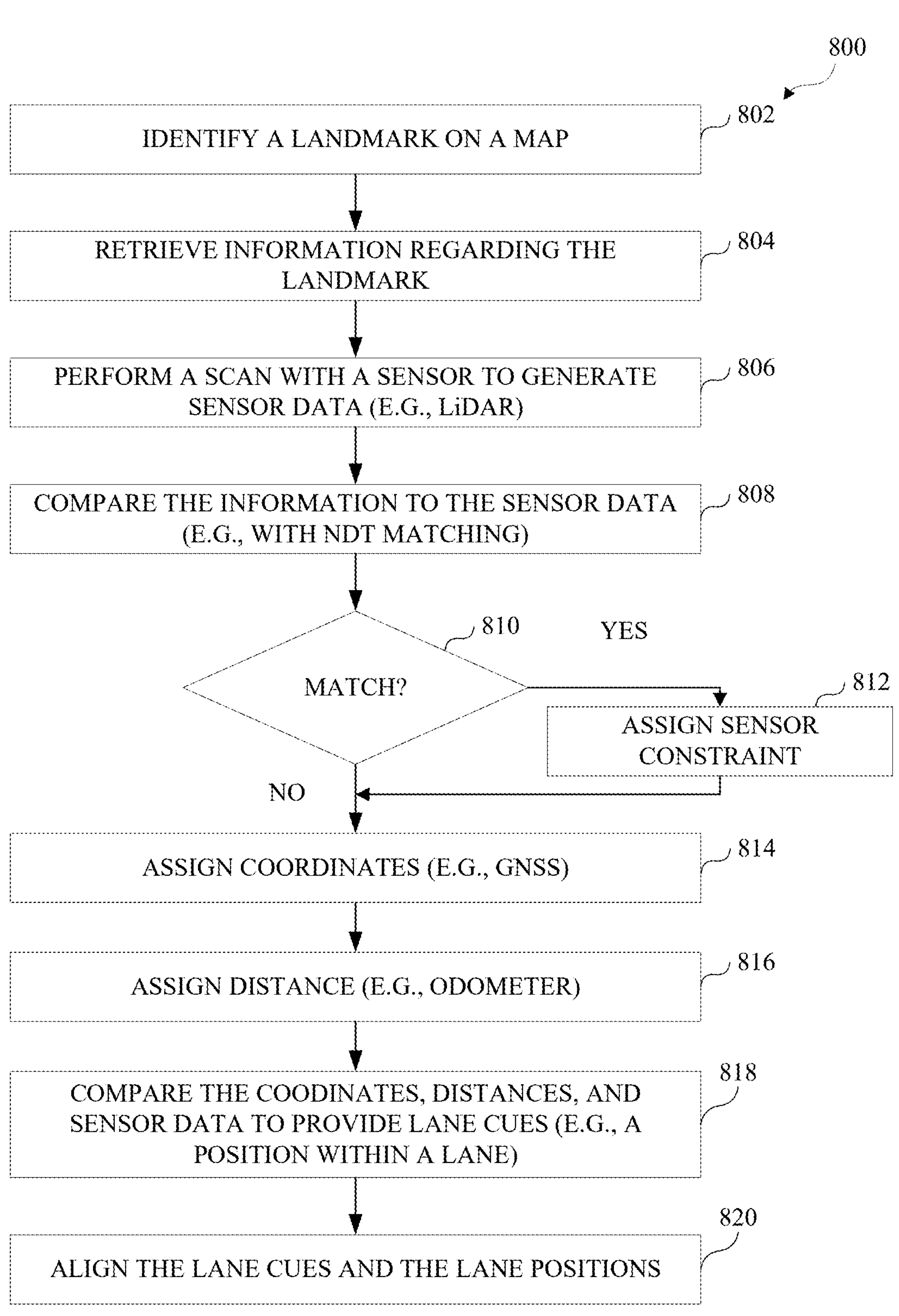
FIG. 8 is a flowchart to align the lane cues.

FIG. 8 is a flow diagram of lane cue alignment 800 (e.g., step of alignment 508 of FIG. 5) of a lane cue generated at, for example, 708 of FIG. 7. As discussed herein, the landmark is identified 802 on a map. The landmark may be any upcoming static object or location such as an intersection. The landmark may have coordinates so that the landmark is identifiable within a coordinate system, in a global positioning system, or both. Once the landmark is identified 802, information regarding the landmark is retrieved 804.

The information retrieved 804 regarding the landmark may be any information that assists in identifying locations of the landmark, locations surrounding the landmark, a perimeter of the landmark, or a combination thereof. The information retrieved 804 may be part of a coordinate system (e.g., a location along an x-axis, along a y-axis, or both; a location within a global positioning system, or both). The information retrieved 804 may be relative to a local map or positioning system of the vehicle transportation network. The information retrieved 804 may be from an online system of a vehicle that stores location information such that when a portion of the system is offline the location of landmarks may be identified. Once the information regarding the landmark is retrieved a scan 806 may be performed to generate sensor data regarding the vehicle transportation network.

The scan 806 may be performed as discussed herein with any of the sensors discussed herein. The scan 806 may be performed to generate one or more data points, a point cloud as discussed herein, or both related to the vehicle transportation network. The scan 806 may be performed by radar, a vision system (e.g., camera), LiDAR, or a combination thereof. The scan 806 may performed to generate data about the landmark (e.g., location information relative to a vehicle). The scan 806 may generate sensor data regarding the vehicle transportation network (e.g., hundreds of data points or even thousands of data points) that is compared 808 to the information retrieved 804 regarding the landmark.

Comparing 808 may be performed by comparing a position from the map of the vehicle transportation network to the sensor data. Comparing 808 may compare coordinates from the map to coordinates of the sensor data, global positioning from the map to global positioning from the sensors, or both. Comparing 808 may be performed by normal distribution transform matching (NDT). The comparing 808 may be performed by dividing the scanned space into cells or points and then comparing the cells or points to locations on the map. Comparing 808 may overlay the data points over the map in order to determine a location of the landmark. Comparing 808 may compare the distribution of the data points relative to the information retrieved 804 regarding the landmark. The comparing 808 may match 810 so that the sensor constraint 812 is assigned. The comparing 808 may not match so that the sensor constraint 812 is not assigned and the coordinates (e.g., from the map, GPS, GNSS, or a combination thereof) are assigned 814.

When the sensor data from the scan 806 matches 810 the landmark information retrieved 804, the sensor data is assigned as a first constraint 812. The sensor data may be assigned as a first constraint 812 on the surroundings around the vehicle. The sensor data constraint 812 so assigned may indicate multiple locations related the landmark. For example, the sensor data may be used to create a point cloud with hundreds of data points or more or even thousands of data points or more regarding a location of the landmark. The sensor constraints assigned 812 about the landmark may indicate a location of an intersection, an entrance of an intersection, a center of an intersection, an exit of an intersection, a building adjacent to a road, an edge of a road, lane lines of a road, other static features around a road, or a combination thereof. The sensor data may be LiDAR data arranged to form a point cloud that demonstrates where the landmarks are located relative to the vehicle so that the vehicle and subsequent vehicles may traverse roads while the system is offline. If the sensor data from the scan 806 does not match the landmark information retrieved 804 then the sensor constraint is not assigned and the coordinates are assigned 814 as a first constraint. Thus, if the information and sensor data match 810 then the sensor data become a first constraint 812 and the coordinates are assigned 814 as a second constraint, and if the information and sensor data do not match 810 then the sensor data is not used and the coordinates become the first constraint.

A sensor data constraint may also be referred to as a GPS constraint, a GNSS constraint, etc., depending on the source of the data.

The coordinates of the landmark are assigned 814 as a constraint regardless of whether the sensor data and landmark information match 810. The coordinates assigned 814 may be known from GNSS, GPS, or both even if the GNSS, GPS, or both are offline. The coordinates assigned 814 may be from a map stored within the system and/or vehicle and retrieved 804. The coordinates assigned 814 may be one constraint (e.g., variable) that the system analyzes to control a vehicle when the system is offline (e.g., GPS, GNSS, or both are not providing information). Once coordinates are assigned 814 distances may be assigned 816 related to the landmarks.

The distances assigned 816 may relate to positions of a landmark along and/or within a route, a road, a lane, or a combination thereof. The distances assigned 816 (e.g., odometer reading or an odometry constraint) relative to the landmark may include a beginning, middle, end, or a combination thereof of the landmark. For example, if the landmark is an intersection then the beginning distance may be 0 Km, the middle of the intersection may be 0.1 Km, and the exit of the intersection may be 0.2 Km. The distance information may provide another constraint (e.g., variable) that may be used to accurately identify landmarks and corresponding lanes adjacent to the landmarks and vehicles so that the vehicle may traverse the lanes when the GPS, GNSS, or both are offline or otherwise unavailable (e.g., blocked within a city). Once all of the constraints are assigned (e.g., 812, 814, 816, or a combination thereof) then the constraints are compared 818.

All of the constraints, once assigned, (e.g., 812, 814, 816, or a combination thereof) may be placed in a factor graph. The factor graph may model the location of the vehicle, the landmark, or the vehicle relative to the landmark by comparing the constraints. The factor graph may be used in combination with simultaneous localization and mapping (SLAM) to generate lane cues within the vehicle transportation network. The coordinates, distances, sensor data, or a combination thereof may all be compared and/or considered in order to generate lane positions within the vehicle transportation network. The coordinates, distances, sensor data, or a combination thereof may be considered to provide a location of a vehicle, a center of a lane, lane lines, a location of a vehicle relative to a landmark, a position of a landmark, or a combination thereof. The coordinates, distances, sensor data, or a combination thereof may provide a lane cue (e.g., a location within a lane where a vehicle travels) as a result of being compared 818. Once lane cues are compared and provided the lane cues may be aligned 820 so that a vehicle may be directed along the lane cues within the lanes of the vehicle transportation network.

The lane cues so aligned 820 may be substantially located within a center of a lane. The lane cues may be located between two land lines. The lane cues and the lane positions may be aligned 820 so that a vehicle travels along the lane cues while GPS or GNSS is offline.

Figure 9:
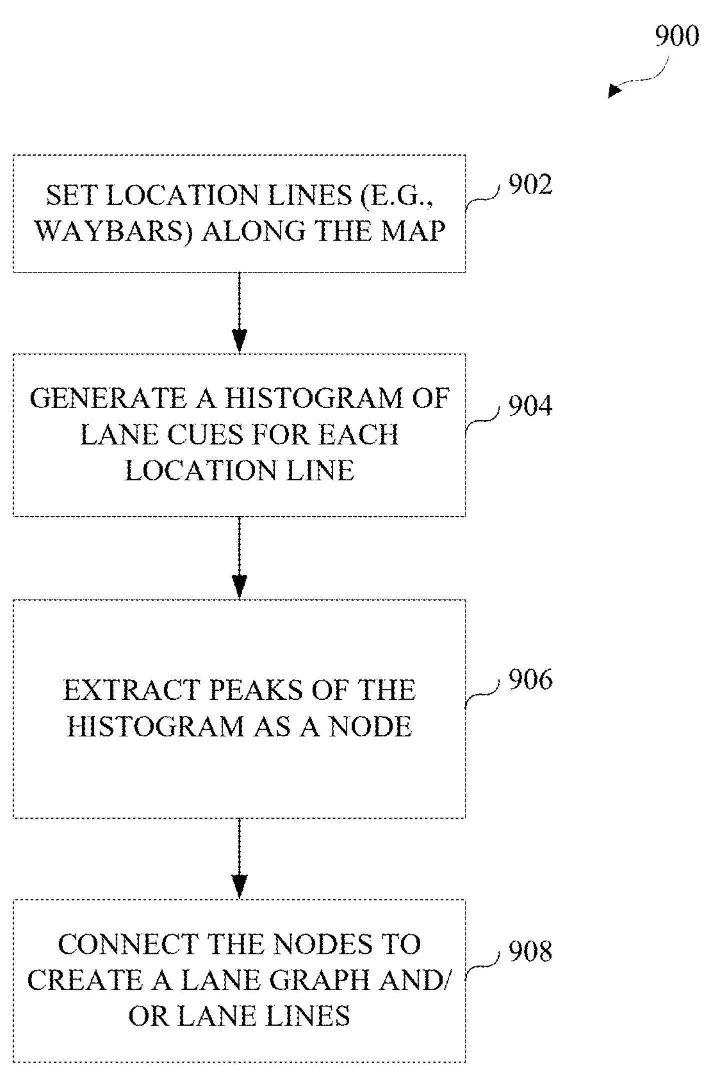
FIG. 9 is a flowchart to estimate a lane graph.

FIG. 9 illustrates a flow diagram of generating a lane graph 900 to provide a lane graph estimation 510 of FIG. 5. The lane graph generation 900 begins by setting location lines 902 (e.g., waybars) along the map and/or route. The location lines may be lines that periodically set and at which data is collected. The location lines may be lines that extend across a lane and that a traveling vehicle crosses so that a cross location at each location line may be determined. The location lines may be spaced apart any distance discussed herein. The location lines may be spaced sufficiently far apart so that a vehicle may travel within a line when GPS, GNSS, or both are offline. The location lines may be spaced 0.5 m or more, 1 m or more, 2 m or more or even 5 m or more apart. The location lines may be spaced about 50 m or less, about 25 m or less, about 15 m or less, about 10 m or less, or about 5 m or less apart. The location lines may be crossed one or more times by vehicles and vehicles pass along the road.

The crossing locations of the vehicles may be plotted over time at each of the location lines. Depending upon a duration of plotting location line crossing there may be ten or more, fifty or more, a hundred or more, a thousand or more, or even ten-thousand or more crossings at each location line. The crossings may be formed into a histogram 904. The histogram may indicate a highest number of location line crossings. The histogram may be a bell curve. The histogram may be dynamic (e.g., the histogram may change over time as more data is received). The histogram may change over time as vehicle crossing at the location lines shift. The histograms 904 at each location line may have a peak.

The peak of the histogram may be extracted and may form a node 906 (e.g., a location the vehicle is directed to cross when the GPS, GNSS, or both are offline). The peak of the histogram may be, at least in part, influenced by the lane cue generation. The peaks may be compared from peak to peak when generating nodes 906 so that when the nodes are connected to create a lane line 908 the vehicle travels substantially along a center of a lane and/or road within the vehicle transportation network. The nodes 906 may be used to correct a center of the lane based upon the peak of the histogram. The nodes may graphically represent a lane-level structure of a road. For example, if two or more lanes are present, the nodes may indicate a center of each lane of the road. The nodes may indicate that a road splits. For example, if a turn lane is added from a first lane, then nodes may indicate that some vehicles have moved from the first lane into the turn lane. The nodes then may indicate where an estimated center of a turn lane is located. Successive nodes may be connected together to indicate where the center of each lane is located over a distance (e.g., the nodes are an estimate of the center based upon the analysis discussed herein). One node may be connected to two successive nodes if the lane is split into another lane, a lane is added, a turning lane is added, or a combination thereof. The nodes may generate a driving location of a vehicle within the vehicle transportation network so that the vehicle travels substantially down a center of a lane.

Figure 10A:
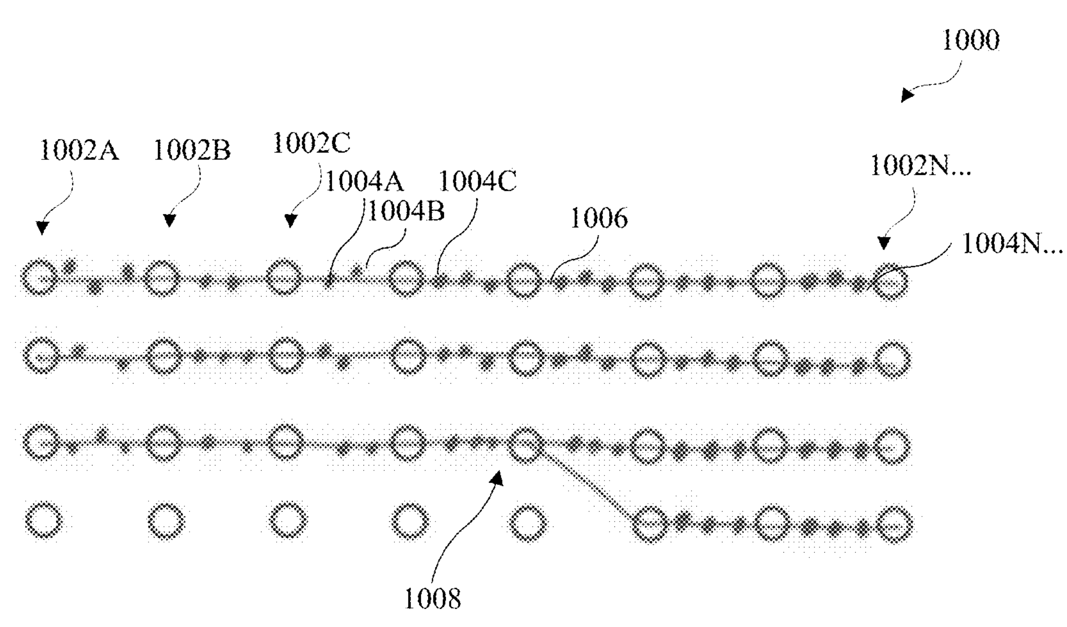
FIG. 10A depicts generating lane lines.

FIG. 10A illustrates a lane graph estimation 1000. The lane graph estimation 1000 is divided by location lines 1002 (e.g., waybars). The location lines 1002 are located a predetermined distance apart from one another. The predetermined distance of the location lines 1002 may be about 0.5 m or more, about 1 m or more, about 2 m or more, or about 3 m or more apart. The predetermined distance may be about 100 m or less, about 50 m or less, about 25 m or less, about 10 m or less, or about 5 m or less apart. The location lines 1002 may be perpendicular to a direction of travel along the lanes. The location lines 1002 may extend across all of the lanes of a road. If a road has 2 lanes then the location lines 1002 extend across both lanes, if the road has 6 lanes then the location lines 1002 extend across all 6 of the lanes. The location lines 1002 may be a location where data is gathered by the vehicle or a system of the vehicle. The locations lines 1002 may be spaced equal distances apart such that there may be location lines 1002A, 1002B, 1002C, and 1002N (e.g., where N may be any integer). The location lines 1002 each time crossed, by a vehicle, may generate a lane cue 1004 so that lane cues 1004A, 1004B, 1004C, and 1004N (e.g., where N may be any integer) are recorded within the vehicle transportation network.

The lane cues 1004 may indicate a location where a center of a vehicle crosses the location lines 1002. The lane cues 1004 may be collected over a period of time, on a first in first out basis, by multiple vehicles, or a combination thereof. The lane cues 1004 may continuously be collected and grouped together by crossing location so that substantially a center of a lane may be determined when GPS, GNSS, or both are offline. The lane cues 1004 may provide a basic lane structure, an indication of a center of a lane or lanes, an estimation of a center of the lane or lanes, where lanes divide, or a combination thereof. The lane cues 1004 may be based on human driving activity, semi-autonomous driving activity, fully autonomous driving activity, or a combination thereof. The lane cues 1004 may change over time as more data is collected. The lane cues 1004 may discarded after a predetermined amount of time. The amount of time may be 1 month or more, 3 months or more, 6 months or more, or 12 months or more. The amount of time may be 5 years or less, 3 years or less, or 1 year or less. The lane cues 1004 may be discarded after a predetermined number of data points are collected. The number of data points maintained to determine the lane cues 1004 may be about 1,000 or more, about 10,000 or more, about 100,000 or more, or about 1,000,000 or more. The number of data points maintained to determine the lane cues may be a 1,000,000,000 or less, 750,000,000 or less, about 500,000,000 or less, about 100,000,000 or less, or about 10,000,000 or less. Once a sufficient number of lane cues 1004 are gathered, the lane cues may be connected together to form a lane line 1006.

The number of lane cues 1004 collected before a lane line 1006 is formed in a lane may be about 25 or more, 50 or more, 100 or more, 250 or more, or even 500 or more. The number of lane cues 1004 collected before a lane line 1006 is formed in a lane may be about 10,000 or less, about 5,000 or less, about 2,000 or less, or even about 1,000 or less. The lane line 1006 may move as more lane cues 1004 are collected. The lane line 1006 may be an estimate of a center of a lane based upon data of vehicles crossing the location lines 1002.

The lane line 1006 may be reviewed if a lane line 1006 moves to one side relative to a series of lane cues 1004 before or after the movement to one side. The review of the lane line 1006 may determine if the movement is proper or if the movement is incorrect. The review of the lane line 1006 may determine if a lane splits 1008.

The lane split 1008 may indicate where one lane becomes two lanes or where two lanes merge together to form one lane. The lane split 1008 may indicate that the movement of the lane line to one side is proper but that a change in a lane has occurred, is occurring, or will occur. The lane split 1008 may be determined by lane cues 1004, lane lines 1006, or both converging or diverging.

Figure 10B:
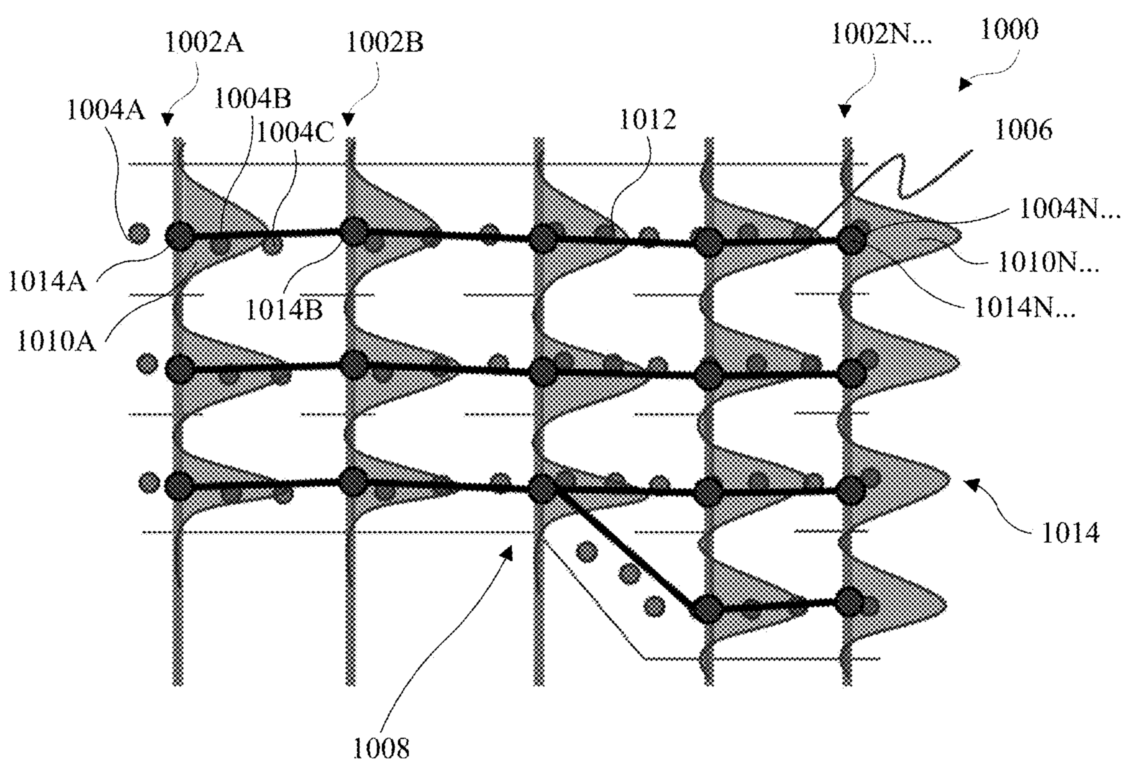
FIG. 10B depicts graphically generating notes to a lane graph.

FIG. 10B illustrates overlying the location lines 1002, lane cues 1004, lane lines 1008, and lane split 1008 of FIG. 10A with a histogram 1010. As shown a histogram 1010 (A-N) (e.g., where N is an integer) at each location line 1002 demonstrating a distribution of the lane cues 1004 for each lane. Each of the histograms 1010 are generally a bell curve with most (e.g., 50 percent or more or even 75 percent or more) of the lane cues 1004 being located at a center of the histogram 1010. The histogram 1010 may have a peak 1012.

The peak 1012 of each of the histograms 1010 may represent the location a majority of the data points, represented by vehicles traveling through a lane, cross a given location line 1002. The peaks 1012 may align with the lane line 1006. The peaks 1012 may be offset relative to the corresponding lane line 1006. The peaks 1012 may indicate substantially a center of a lane (e.g., ±10 cm or less, ±5 cm or less, or ±3 cm or less from center of a lane). The histogram 1010 may have a steepness that terminates at a peak. The histogram 1010 may begin flatter and then over time as more data is collected and data is discarded, the histogram 1010 may become steeper so that the standard deviation is reduced compared to a standard deviation of an initial histogram 1010. Stated another way, the distribution of the histograms 1010 may be larger initially and then the distribution may reduce over time resulting in steeper histograms and peaks located closer to the center relative to initial histograms 1010 (e.g., correct a center of the lane based on the peak of the histogram). The peak 1012 of each histogram 1010 may be recorded as a node 1014.

Each node 1014 once recorded may represent a location that a vehicle will cross when the GPS, GNSS, or both are offline or are free of communication with the system and/or vehicle. The nodes 1014 may move over time as more data is collected. The nodes 1014 may hone in on the center line as data is discarded and new data is added. For example, a first node 1014 may be located within 7 cm or the center line, a duration of time later (e.g., 1 month) a second node 1014 may be located 5 cm from the center line and then a second duration of time later (e.g., 3 months) a third node 1014 may be located 3 cm from center. Thus, the nodes 1014 may be refined over time so that the travel of the vehicle within a lane becomes more and more accurate and precise over time. The vehicle may then be controlled to travel along the nodes 1014 and substantially along the center of the lane within the vehicle transportation network.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein.

Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus of a vehicle, comprising:

a processor configured to:

generate at least one landmark within a vehicle transportation network that includes a lane;

generate lane cues for the lane as the vehicle travels within the vehicle transportation network;

align the lane cues within the lane of the vehicle transportation network;

generate a lane graph estimation based upon the lane cues so that the vehicle travels substantially along a center of the lane within the vehicle transportation network; and compare the center of the lane generated by the lane graph estimation to the at least one landmark to check a location of the center of the lane, wherein the vehicle is at least temporarily free of communication with a global positioning satellite (GPS), a global navigation satellite system (GNSS), or both as the vehicle travels within the vehicle transportation network and generates the lane cues.

2. The apparatus of claim 1, wherein the processor is configured to:

identify an intersection that is upcoming from a map; and estimate a position relative to the intersection that is upcoming to generate some of the at least one landmark.

3. The apparatus of claim 2, further comprising:

a light detecting and ranging sensor (LiDAR) that records points adjacent to and within the intersection as the vehicle travels relative to and through the intersection so that a position of the vehicle relative to the intersection is identified.

4. The apparatus of claim 1, wherein to generate the lane cues comprises to estimate a center of the lane by at least one of:

defining bars a predetermined distance apart and measure a crossing point of the vehicle relative to the bars;

monitoring surrounding vehicles relative to the bars, the vehicle, or both; or determining a mid-point between a first lane line and a second lane line.

5. The apparatus of claim 1, wherein to align the lane cues comprises to:

compare location information regarding the at least one landmarks to sensor data from a sensor on the vehicle by normal distribution transform (NDT) matching.

6. The apparatus of claim 5, wherein the processor is configured to, if the location information and the sensor data match, at least one of:

assign a GNSS constraint; or assign an odometry constraint.

7. The apparatus of claim 1, wherein processor is configured to:

control the vehicle to travel along the center of the lane.

8. The apparatus of claim 1, wherein the processor is configured to:

graph the lane cues to form a histogram; and determine a peak of the histogram.

9. The apparatus of claim 8, wherein the processor is configured to:

correct the center of the lane based on the peak of the histogram.

10. A method, comprising:

generating at least one landmark within a vehicle transportation network that includes a lane;

generating lane cues for the lane as vehicles travel within the vehicle transportation network;

aligning the lane cues within the lane of the vehicle transportation network;

generating a lane graph estimation based upon the lane cues so that the vehicles travel substantially along a center of the lane within the vehicle transportation network; and comparing the center of the lane generated by the lane graph estimation to the at least one landmark to check a location of the center of the lane, wherein the vehicles are at least temporarily free of communication with a global positioning satellite (GPS), a global navigation satellite system (GNSS), or both as the vehicles travel within the vehicle transportation network and generate the lane cues.

11. The method of claim 10, comprising:

identifying an upcoming intersection from a map; and estimating a position relative to the upcoming intersection to generate some of the at least one landmark.

12. The method of claim 11, wherein estimating the position relative to the upcoming intersection comprises recording points adjacent to and within the intersection with a light detecting and ranging sensor (LiDAR).

13. The method of claim 10, wherein generating the lane cues comprises estimating a center of the lane by at least one of:

defining bars a predetermined distance apart and measuring a crossing point of the vehicle relative to the bars;

monitoring surrounding vehicles relative to the bars, the vehicle, or both; or determining a mid-point between a first lane line and a second lane line.

14. The method of claim 10, wherein aligning the lane cues comprises:

comparing location information regarding the at least one landmark to sensor data from a sensor on the vehicle using normal distribution transform (NDT) matching.

15. The method of claim 14, wherein if the location information and the sensor data match, performing at least one of:

assigning a GNSS constraint; or assigning an odometry constraint.

16. The method of claim 10, comprising:

controlling the vehicle to travel along the center of the lane.

17. A non-transitory computer-readable medium storing instructions operable to cause one or more processors to perform operations comprising:

generating at least one landmark within a vehicle transportation network that includes a lane;

generating lane cues for the lane as vehicles travel within the vehicle transportation network;

aligning the lane cues within the lane of the vehicle transportation network;

generating a lane graph estimation based upon the lane cues to generate a node indicating a center of the lane within the vehicle transportation network;

connecting successive nodes together to form a drive line; and comparing the drive line to the at least one landmark to determine if the drive line and information regarding the at least one landmark are a match, wherein the vehicles are at least temporarily free of communication with a global positioning satellite (GPS), a global navigation satellite system (GNSS), or both as the vehicles travel within the vehicle transportation network and generate the lane cues.

18. The non-transitory computer-readable medium of claim 17, wherein the operations comprise:

identifying an upcoming landmark from a map; and estimating a position relative to the upcoming landmark to generate some of the at least one landmark.

19. The non-transitory computer-readable medium of claim 18, wherein estimating the position relative to the upcoming landmark comprises recording points adjacent to and within the landmark with a light detecting and ranging sensor (LiDAR).

20. The non-transitory computer-readable medium of claim 17, wherein generating the lane cues comprises estimating a center of the lane by at least one of:

defining bars a predetermined distance apart and measuring a crossing point of the vehicle relative to the bars;

monitoring surrounding vehicles relative to the bars, the vehicle, or both; or determining a mid-point between a first lane line and a second lane line.

* * * * *